United States Patent
Strohmeier

[15] 3,690,513
[45] Sept. 12, 1972

[54] APPARATUS FOR SUPPLYING FLOWABLE MATERIAL

[72] Inventor: Harald Strohmeier, Kapfenburg, Austria

[73] Assignee: Gebr. Bohler & Co. A.G., Kapfenberg, Austria

[22] Filed: Feb. 3, 1971

[21] Appl. No.: 112,376

[30] Foreign Application Priority Data

Feb. 10, 1970  Austria.............................1173

[52] U.S. Cl..................................................222/55
[51] Int. Cl. ................................................B67d 5/08
[58] Field of Search............222/55, 56, 52, 112, 113; 177/120

[56] References Cited

UNITED STATES PATENTS 2,778,387   1/1957   Diehl.....................177/120 X
3,338,472   8/1967   Gardner......................222/55

Primary Examiner—Stanley H. Tollberg
Attorney—Holman & Stern

[57] ABSTRACT

Flowable material is supplied to a feed hopper. Feeder screw means disposed in said feed hopper are operated to force said material out of said hopper and to exert a thrust which varies with the amount of flowable material in said hopper. The supply of additional flowable material to said hopper is controlled in response to said thrust.

8 Claims, 2 Drawing Figures

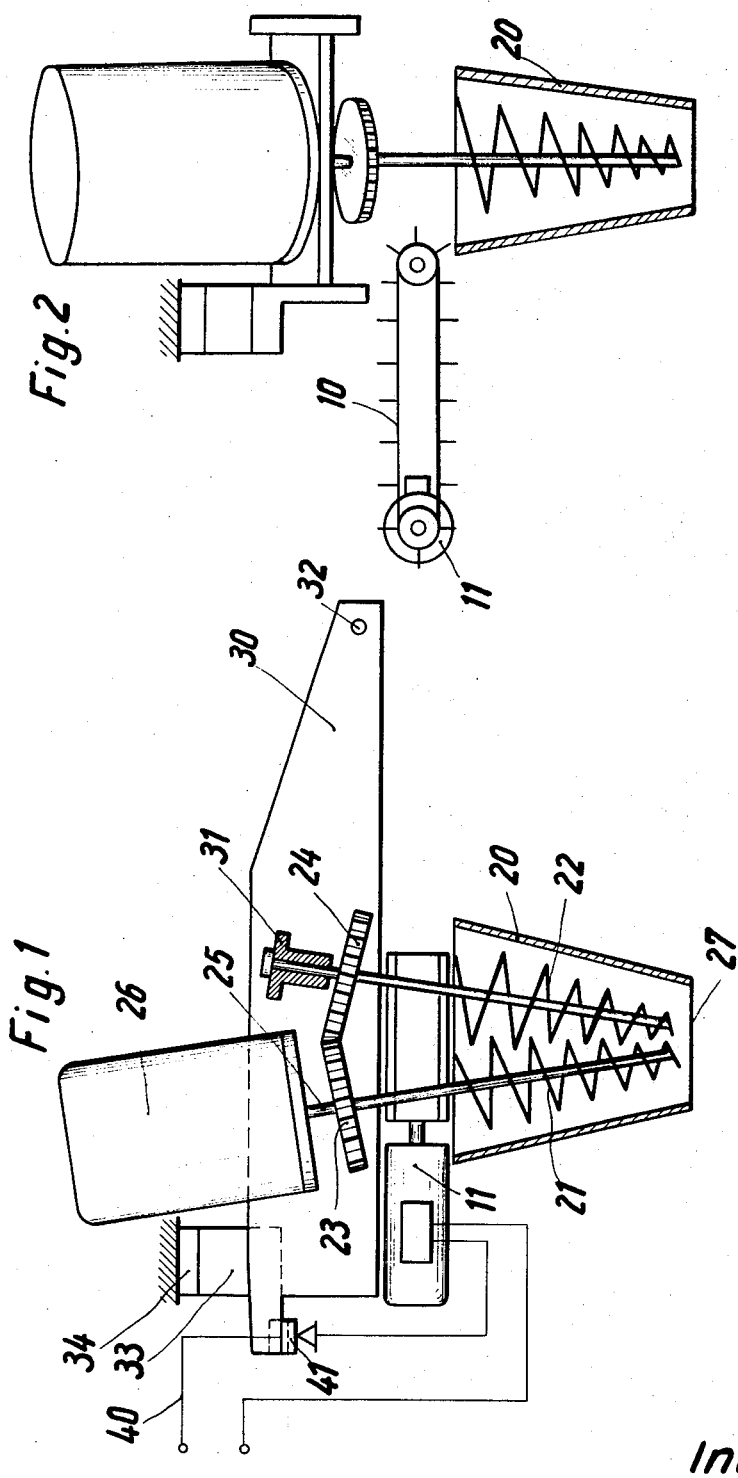

APPARATUS FOR SUPPLYING FLOWABLE MATERIAL

It is an object of the invention to provide a highly reliable and simple process of fully automatically supplying coating compositions for welding electrodes to a screw extruder, which serves to form a coating on the welding wire continuously and at a high speed. This object is accomplished according to the invention in that the coating composition is supplied, e.g., by means of a belt conveyor, to one or more feeder screws, which are disposed in a feed hopper, and that the rate at which the coating composition is supplied to said feeder screws is controlled in response to the thrust exerted by one or more of the feeder screws.

In one of the various apparatus with which the process according to the invention can be carried out, a conveyor is driven by an electric motor (gearmotor) and consists, e.g., of a belt conveyor or a vibrating trough and supplies the coating composition to a stationary feed hopper, in which two rotating and meshing feeder screws are disposed, which are mounted on a substantially horizontal beam and positively connected by gears, the feed hopper has at its lower end an opening through which the coating composition is forced by the feeder screws, the beam is pivoted at one end, e.g., on a stationary pin, an electric switch is disposed adjacent to the beam and preferably near the other end thereof and is arranged to be closed by the beam as the latter descends, and the switch is disposed in the electric power supply line connected to the electric motor (gearmotor).

The present process will now be fully explained with reference to the drawing, in which an embodiment of the apparatus according to the invention is shown diagrammatically and by way of example.

FIG. 1 is a partly sectional elevation showing apparatus for controlling the supply of a coating composition for welding electrodes and FIG. 2 is a partly sectional side elevation showing the same apparatus.

The coating composition to be supplied is supplied by a belt conveyor 10 to a stationary feed hopper 20, in which two meshing feeder screws 21 and 22 are disposed, which rotate in mutually opposite directions and are positively connected by two gears 23 and 24. The coating composition supplied to the feeder screws 21 and 22 is forced by the latter through an opening 27 in the feed hopper 20 to a screw extruder (not shown), which is disposed below the feed hopper. One feeder screw 21 is directly coupled to a stub shaft 25 of an electric gearmotor 26 secured to a beam 30. The other feeder screw 22 is rotatably mounted in a bearing 31, which is carried by the beam 30, which always has a substantially horizontal orientation and is pivoted at one end on a pin 32. When the feed hopper 20 and the screw channels of the feeder screws 21 and 22 contain only little coating composition, the thrust exerted by the feeder screws 21 and 22 is reduced to such an extent that the weight of the beam 30, the weight of the electric gearmotor 26 and a biasing force additionally provided result in a downward pivotal movement of the beam 30 so that the latter closes a switch 41, which is disposed near that end of the beam which is opposite to the pin 32. As a result, electric current flows through a line 40, which includes the switch 41, to a second electric gear-motor 11, which drives the belt conveyor 10. The above-mentioned biasing force additionally provided is exerted by a resilient rubber buffer 33, which is adjacent to that end of the beam 30 which is remote from the pin 32 bears on the underside of a stationary abutment 34 and on the top side of the beam 30. The rubber buffer 33 may be replaced by a spring or a pneumatic dashpot. When the feed hopper 20 contains much coating composition, the axial thrust of the feeder screws 21 and 22 is increased and raises the beam 30 against the action of the weight of the beam, the weight of the electric gearmotor 26 and the additional biasing force so that the switch 41 is opened. This is shown in dash-dot lines. As a result, the second electric gearmotor 11 and the belt conveyor 10 are stopped and the supply of coating composition into the feed hopper 20 is discontinued. The cycle described hereinbefore is then repeated. The apparatus which has been described above may thus be used to carry out the process according to the invention.

What is claimed is:

1. Apparatus for supplying flowable material, which apparatus comprises
   a stationary feed hopper having an opening at its lower end,
   a substantially horizontal beam, which is pivoted at one end on a horizontal axis which is transverse to the longitudinal axis of said beam,
   feeder screw means carried by said beam and rotatable to force flowable material out of said feed hopper through said opening and to exert a thrust, which varies with the amount of flowable material in said feed hopper and opposes a downward pivotal movement of said beam,
   a conveyor operable to supply flowable material to said feed hopper,
   an electric motor energizable to operate said conveyor, and
   an electric power supply line for energizing said electric motor, said line including a switch disposed adjacent to said beam and adapted to be closed in response to a downward pivotal movement of said beam.

2. Apparatus as set forth in claim 1, in which said conveyor is a belt conveyor.

3. Apparatus as set forth in claim 1, in which said conveyor is a vibrating trough.

4. Apparatus as set forth in claim 1, in which said feeder screw means comprise a plurality of meshing feeder screws, which are positively connected by gear means.

5. Apparatus as set forth in claim 1, in which said electric motor is a gearmotor.

6. Apparatus as set forth in claim 1, in which said beam is pivoted on a stationary pin.

7. Apparatus as set forth in claim 1, in which said switch is disposed near that end of said beam which is remote from said one end.

8. Apparatus as set forth in claim 1, which comprises
   a stationary abutment and
   a resilient rubber buffer bearing on the underside of said abutment and the top side of said beam adjacent to that end thereof which is opposite to said one end.

\* \* \* \* \*